United States Patent
Iyer et al.

(10) Patent No.: US 11,838,333 B2
(45) Date of Patent: Dec. 5, 2023

(54) CONTINUITY OF AUDIO AND/OR VIDEO PRESETS ACROSS DIFFERENT CONTEXTS

(71) Applicant: Dell Products, L.P., Round Rock, TX (US)

(72) Inventors: Vivek Viswanathan Iyer, Austin, TX (US); Srinivasa Ragavan, Bangalore (IN); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/661,572

(22) Filed: May 2, 2022

(65) Prior Publication Data
US 2023/0353610 A1 Nov. 2, 2023

(51) Int. Cl.
*G06F 15/16* (2006.01)
*H04L 65/401* (2022.01)
*G06F 3/16* (2006.01)
*G06F 3/14* (2006.01)
*H04L 65/403* (2022.01)

(52) U.S. Cl.
CPC .......... *H04L 65/401* (2022.05); *G06F 3/1407* (2013.01); *G06F 3/165* (2013.01); *H04L 65/403* (2013.01)

(58) Field of Classification Search
CPC ... H04L 65/401; H04L 65/403; G06F 3/1407; G06F 3/165
USPC .................................................. 709/203–204
See application file for complete search history.

(56) References Cited

U.S. PATENT DOCUMENTS

| | | | |
|---|---|---|---|
| 2013/0197674 A1* | 8/2013 | Lowry | B60W 50/08 700/19 |
| 2015/0297991 A1* | 10/2015 | Mahlmeister | G06F 3/023 463/29 |
| 2019/0095251 A1* | 3/2019 | Wang | G06F 9/544 |
| 2019/0258366 A1* | 8/2019 | Athale | G06F 16/13 |
| 2020/0029126 A1* | 1/2020 | Blake | H04N 21/42203 |
| 2020/0218522 A1* | 7/2020 | Shah | G06F 8/61 |

* cited by examiner

*Primary Examiner* — Duyen M Doan
(74) *Attorney, Agent, or Firm* — Fogarty LLP (57) ABSTRACT

Systems and methods for providing continuity of audio and/or video (A/V) presets across different contexts are described. In an embodiment, an Information Handling System (IHS), may include a processor and a memory coupled to the processor, the memory having program instructions stored thereon that, upon execution, cause the IHS to: identify a first audio or video setting used by a first audio or video device in a first context; normalize the first audio or video setting into a normalized setting; in response to a determination that the IHS is in a second context, translate the normalized setting into a second audio or video setting; and apply the second audio or video setting to a second audio or video device.

20 Claims, 6 Drawing Sheets

CONTINUITY OF AUDIO AND/OR VIDEO PRESETS ACROSS DIFFERENT CONTEXTS

FIELD

This disclosure relates generally to Information Handling Systems, and, more specifically, to systems and methods for providing continuity of audio and/or video presets across different contexts.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for providing continuity of audio and/or video presets across different contexts are described. In an illustrative, non-limiting embodiment, an Information Handling System (IHS), may include a processor and a memory coupled to the processor, the memory having program instructions stored thereon that, upon execution, cause the IHS to: identify a first audio or video setting used by a first audio or video device in a first context; normalize the first audio or video setting into a normalized setting; in response to a determination that the IHS is in a second context, translate the normalized setting into a second audio or video setting; and apply the second audio or video setting to a second audio or video device.

The first audio or video setting may include at least one of: brightness, contrast, white-balance, anti-flicker, auto-zoom, auto-framing, pan, tilt, zoom, video noise suppression, sharpness, or virtual background. Additionally, or alternatively, the first audio or video device may include at least one of: an integrated camera or an external camera. Additionally, or alternatively, the first audio or video setting may include at least one of: input volume, output volume, balance, equalization, audio noise suppression, or echo cancellation. Additionally, or alternatively, the first audio or video device may include at least one of: an integrated microphone, an external microphone, an integrated speaker, or an external speaker. Additionally, or alternatively, the first audio or video device may include a device make or model, and the second audio or video device may include a different device make or model.

The first context may include a first application in execution by the IHS, and the second context may include a second application in execution by the IHS. Additionally, or alternatively, the first context may include a first workspace where the IHS and the first audio or video device are located, and the second context may include a second workspace where the IHS and the second audio or video device are located.

The program instructions, upon execution, may cause the IHS to: transmit the normalized setting to a remote service after the normalization of the first audio or video setting into the normalized setting; and retrieve the normalized setting from the remote service prior to the translation of the normalized setting into the second audio or video setting. Additionally, or alternatively, the program instructions, upon execution, may cause the IHS to: determine a change to the first audio or video setting; and update the normalized audio or video setting to reflect the change.

In another illustrative, non-limiting embodiment, a method may include: identifying a first audio or video setting selected by a user operating a first IHS; normalize the first audio or video setting into a normalized setting; transmitting the normalized setting to a remote service; determining that the user is operating a second IHS; retrieving the normalized setting from the remote service; translating the normalized setting into a second audio or video setting; and applying the second audio or video setting to the second IHS.

The first audio or video setting may include at least one of: brightness, contrast, white-balance, anti-flicker, auto-zoom, auto-framing, pan, tilt, zoom, video noise suppression, sharpness, or virtual background. Additionally, or alternatively, the first audio or video setting may include at least one of: input volume, output volume, balance, equalization, audio noise suppression, or echo cancellation. The first IHS may be coupled to an audio or video device, and the second IHS may be coupled to a different audio or video device having a different device make or model.

The method may also include determining that the second IHS is executing a video conferencing application, and applying the second audio or video setting, at least in part, in response to the determination. The method may further include determining that the second IHS is located in a selected workspace, and applying the second audio or video setting, at least in part, in response to the determination.

In yet another illustrative, non-limiting embodiment, a memory storage device may have program instructions stored thereon that, upon execution by an IHS, cause the IHS to: identify a first audio or video setting used in connection with a first audio or video device coupled to the IHS in a first workspace; normalize the audio or video setting into a normalized setting; in response to a determination that the IHS is in a second workspace, translate the normalized setting into a second audio or video setting; and use the second audio or video in connection with a second audio or video device coupled to the IHS in the second workspace.

The first and second audio or video settings may be different from each other. The first and second audio or video settings may provide a same visual or audio sensory experience to a user of the IHS in the first and second workspaces. The first and second audio or video setting may be selected from the group consisting of: brightness, contrast, white-balance, anti-flicker, auto-zoom, auto-framing, pan, tilt, zoom, video noise suppression, sharpness, virtual background, input volume, output volume, balance, equalization, audio noise suppression, and echo cancellation.

Moreover, the program instructions, upon execution, may cause the IHS to determine that the second IHS is executing a video conferencing application, and use the second audio or video setting, at least in part, in response to the determination.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In modern enterprises, the term "hoteling" (or "office hoteling"), shared workspaces, or co-working spaces collectively refer to physical environments where clients, users, or employees can schedule their hourly, daily, or weekly use of individual workspaces, such as office desks, cubicles, or conference rooms—thus serving as an alternative to conventional, permanently assigned seating. In some cases, hoteling clients, users, or employees access a reservation system to book an individual workspace (e.g., a desk, a cubicle, a conference room, an office, etc.) before they arrive at work, which gives them freedom and flexibility to work wherever they want to. In other cases, individual workspaces may also be available to users without a reservation system on a first-come, first-serve basis (e.g., in the lobby of a hotel or in a library).

Each individual workspace in a shared workspace may include its own set of audio and/or video (A/V) peripheral devices (e.g., an external camera or webcam, an external microphone, an external speaker, etc.). When a client, user, or employee reaches an individual workspace, they bring their own IHSs and choose between: A/V devices integrated into their IHS, or external A/V devices found in that workspace. Moreover, which A/V device(s) are selected at any given time may depend on the user's context (e.g., identity or type of IHS, application being executed, whether the application is being executed in the foreground or in the background, A/V devices available, etc.).

Users may connect to different A/V devices each workday, particularly when executing collaboration applications, multimedia applications, or the like. For example, a user may employ a BLUETOOTH (BT) speaker with integrated microphone and webcams when in a home environment, a BT headset with an external webcam in a cubicle environment, or a BT headset with integrated webcam when working from any other place. As a result, users may find themselves spending an inordinate amount of time configuring various A/V presets for a plurality of A/V devices used by any number of applications, sometimes on different IHSs, and may have to re-configure those presets at every session.

In some cases, a user may wish to have specific operating parameters, settings, or configurations—generally referred to herein as "presets"—applied to different A/V devices used by different IHS's executing different types of applications (e.g., multimedia playback, audio or video recording, audio-only calls, videoconferencing, etc.) in different workspaces (e.g., at home, at the office, in an individual unit of a shared workspace, when traveling, etc.). Examples of A/V presets include, but are not limited to: input volume, output volume, balance, equalization, audio noise suppression, echo cancellation, brightness, contrast, white-balance, anti-flicker, auto-zoom, auto-framing, pan, tilt, zoom, video noise suppression, sharpness, virtual background, etc.

For example, in a first hypothetical scenario, a user may select audio presets for a collaboration application (e.g., ZOOM, TEAMS, etc.) tied to a set of audio devices. If the user starts a conference call with an audio output volume of 30%, and later increases the volume to 40% while attending a training session. Ordinarily, if the user later started another conference call, the audio output volume would remain at 40%, and would not switch back to 30%.

In a second hypothetical scenario, a user may select a video configuration for a collaboration application tied to a video capture device. If the user starts a videoconferencing session from their office using an external webcam, and selects pan, tilt, and focus parameters, but then switches to an IHS-integrated webcam when working from home, the user must manually re-adjust video presets for the collaboration application that are appropriate to the new device and environment.

To address these, and other concerns, systems and methods described herein may enable continuity of A/V presets across different contexts. In various implementations, these systems and methods may provide an IHS, Operating System or "OS" (e.g., WINDOWS, MACOS, iOS, ANDROID, LINUX, etc.), A/V device, and Independent Software Vendor (ISV)-agnostic architectural framework to capture, process, and configure A/V presets across different contexts. A remote or cloud service control point, as well as an inter-operation or "interop" A/V service and an A/V shim layer executed by an IHS may be collectively configured to translate normalized A/V presets to context-specific configurations (e.g., using Universal Serial Bus or "USB" video device class or "UVC" commands, or the like), which are then applied to the operation of currently selected A/V devices.

Figure 1:
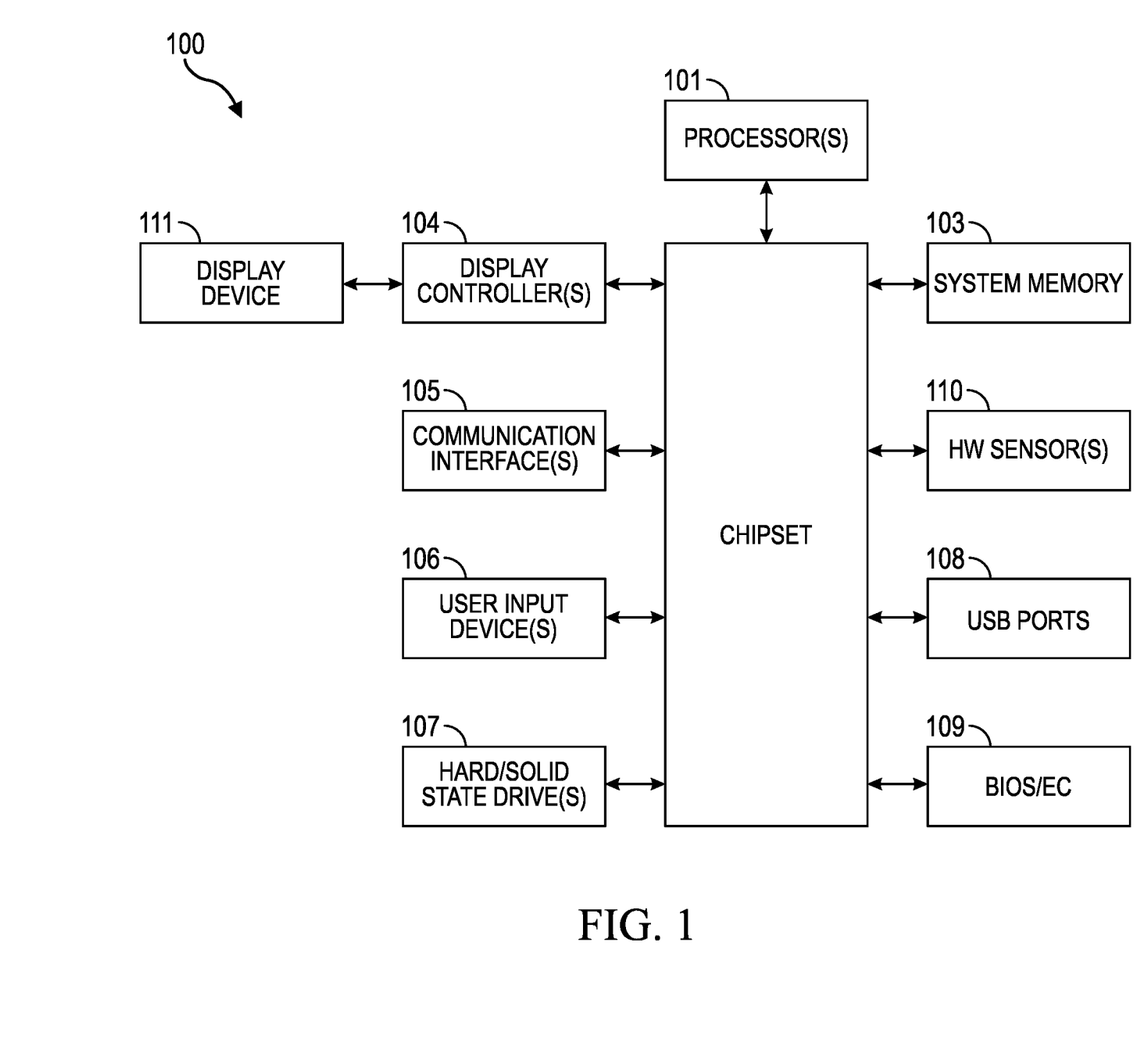
FIG. 1 depicts a block diagram of examples of components of an Information Handling System (IHS), according to some embodiments.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., CDMA, TDMA, LTE, etc.), satellite networks, or the like. In some cases, communication interface(s) 105 may be used to communicate with A/V devices (e.g., BT speakers, microphones, headsets, etc.). Moreover, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more USB ports 108, to which one or more A/V peripheral devices may be coupled (e.g., internal or external webcams, microphones, speakers, etc.).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

In various embodiments, when a client arrives at a particular workspace, their IHS may be coupled to one or more A/V peripheral devices via a Workspace Managing Device (WMD) such as a dock, docking station, intelligent hub, external display, wireless KVM, or other IHS. Additionally, or alternatively, a client's IHS may be directly coupled to one or more A/V peripheral devices using any suitable wireless communication protocol (e.g., BT, BT LOW ENERGY or "BLE," ZIGBEE, Z-WAVE, WI-FI, WI-FI DIRECT, etc.). Moreover, a workspace may be served by one of a plurality of distributed Access Points (APs) for network/Internet connectivity, such as wireless routers or the like.

Figure 2A:
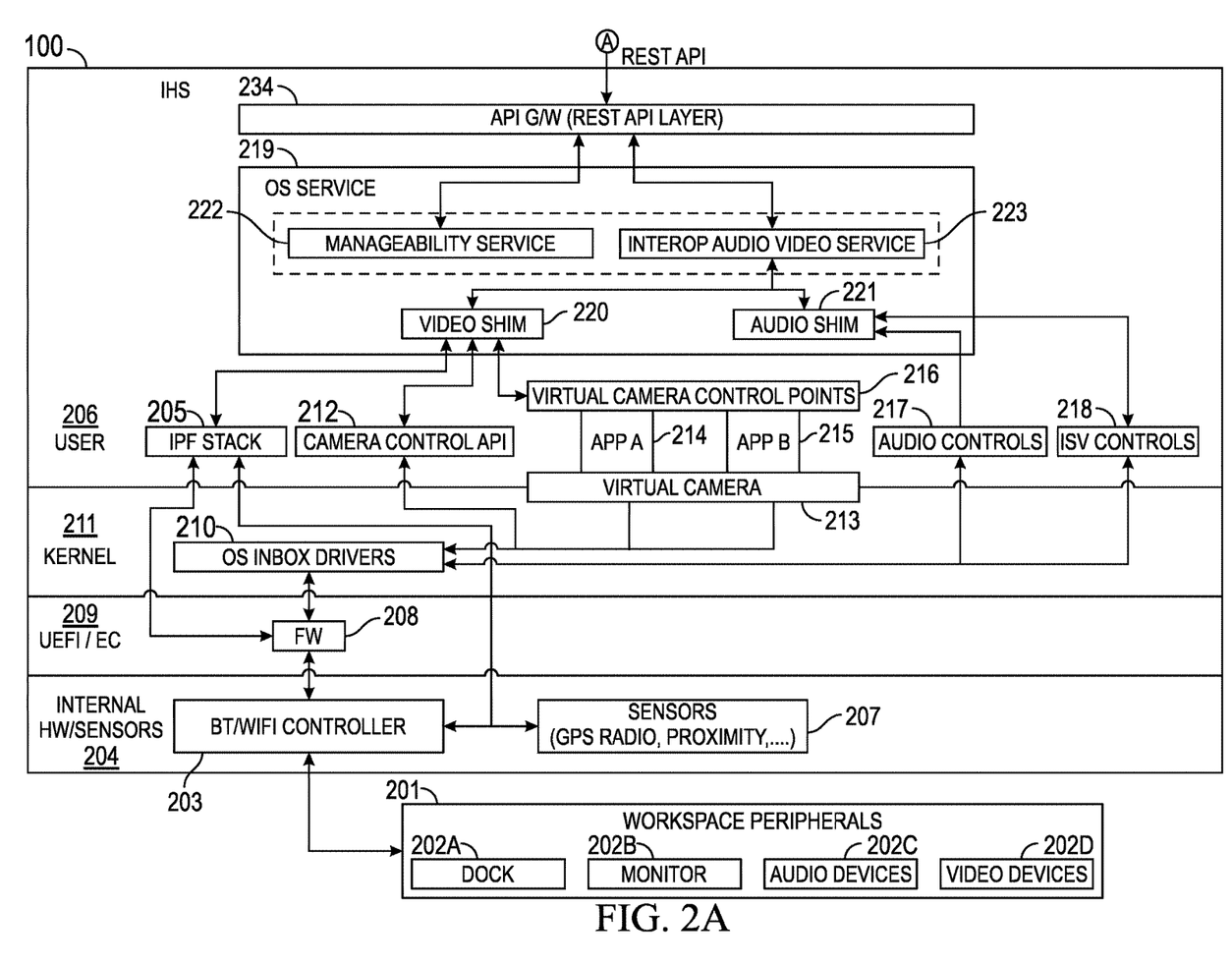
FIGS. 2A and 2B collectively depict a block diagram of an example of a system for providing continuity of audio and/or video (A/V) presets across different contexts, according to some embodiments.
Figure 2B:
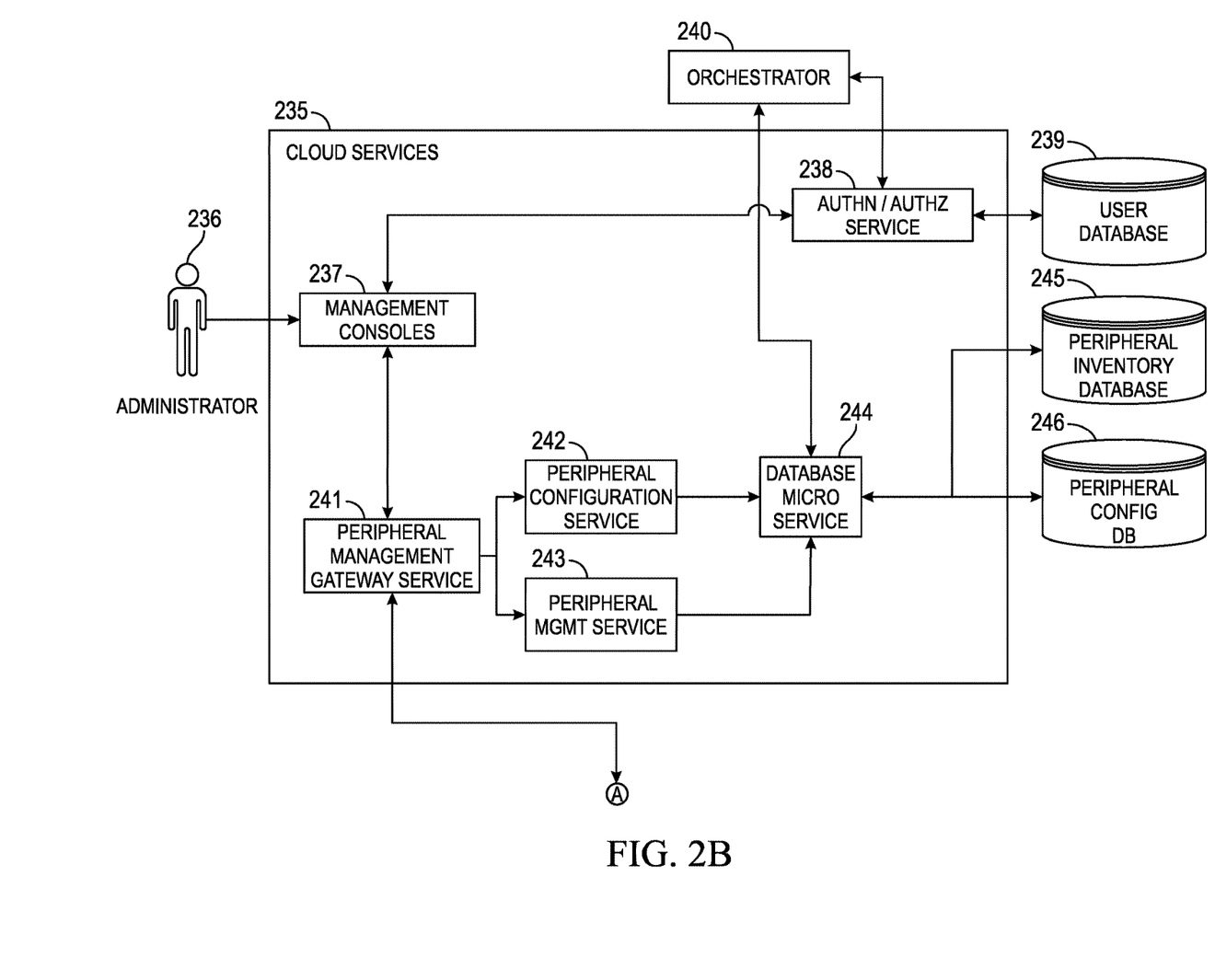

FIGS. 2A and 2B collectively depict a block diagram of an example of a system for providing continuity of A/V presets across different contexts, according to some embodiments. Particularly, as shown in FIG. 2A, IHS 100 may be disposed in a workspace (the user's home, a shared workspace, a cubicle, a desk, a conference room, a coffee shop, etc.) where peripheral devices 201 are available, including dock 202A, monitor 202B, audio devices 202C (e.g., USB or wireless microphone or speakers), and video devices 202D (e.g., USB or wireless webcam). In some cases, IHS 100 may be coupled to one or more peripheral devices 201 via dock 202A.

System components of IHS 100 are divided into hardware/sensor layer 204, UEFI/EC layer 209, kernel space 211, and user space 206. Particularly, BT/WiFi controller 203 of layer 204 and sensors 207 (e.g., HW sensors 110 in FIG. 1) are coupled to platform framework (IPF) stack 205 in user space 206. Firmware (FW) 208 of UEFI/EC layer 209 is coupled to BT/WiFi controller 203 in hardware/sensor layer 204, OS drivers 210 in kernel space 211, and IPF stack 205 in user space 206. OS drivers 210 are coupled to camera control Application Programming Interface (API) 212, virtual camera engine 213, audio control module 217, and ISV control module 218 in user space 206.

Virtual camera engine 213 is coupled to first application 214 (e.g., ZOOM) and second application 215 (e.g., TEAMS). It should be noted, however, that any number of applications may be executed in user space 206. Each of applications 214 and 215 is coupled to virtual camera control points 216.

OS service 219 includes manageability service 222 and interop A/V service 223. Moreover, interop A/V service 223 is coupled to video shim 220 and audio shim 221. Video shim 220 is coupled to camera control API 212 and to virtual camera control points 216. Audio shim 221 is coupled to audio control module 217 and ISV control module 218. Furthermore, manageability service 222 and interop A/V service 223 are in communication with cloud services 235 via gateway API 234 (e.g., a representational state transfer or "REST" API).

In operation, interop A/V service 223 is configured to monitor, capture, and configure A/V presets based on a user's current context. Video shim 220 comprises a library layer configured to abstract, generalize, and/or normalize different video frameworks and/or modules, and to provide a single video configuration API. Conversely, audio shim 221 comprises a library layer configured to abstract, generalize, or normalize different audio frameworks and/or modules, and to provide a single audio configuration API. Meanwhile, gateway API 234 is responsible for exposing A/V preset configurations from the edge, and acts as a gateway for outgoing requests. Virtual camera control points 216 enables virtual camera controls for configuring video settings.

On the back end, administrator 236 may access cloud services 235 to onboard and manage IHS 100 and peripherals 201 using management console 237 (e.g., INTUNE, WORKSPACE ONE, etc.). Management console(s) 237 may authenticate or authorize a user (e.g., single sign-on, active directory, etc.) using AuthN/AuthZ service 238 coupled to user database 239. Upon authentication, IHS 100 may be provisioned remote services from workspace orchestrator 240 through manageability service 222.

Within cloud services 235, peripheral management gateway service 241 is coupled to gateway API 234 and management console 237. Peripheral configuration service 242 and device management service 243 are both coupled to peripheral management gateway service 241. Database microservice 244 is coupled to peripheral configuration service 242, device management service 243, and orchestrator 240. Database microservice 244 is configured to manage and access peripheral inventory database 245 and device configuration database 246.

Figure 3:
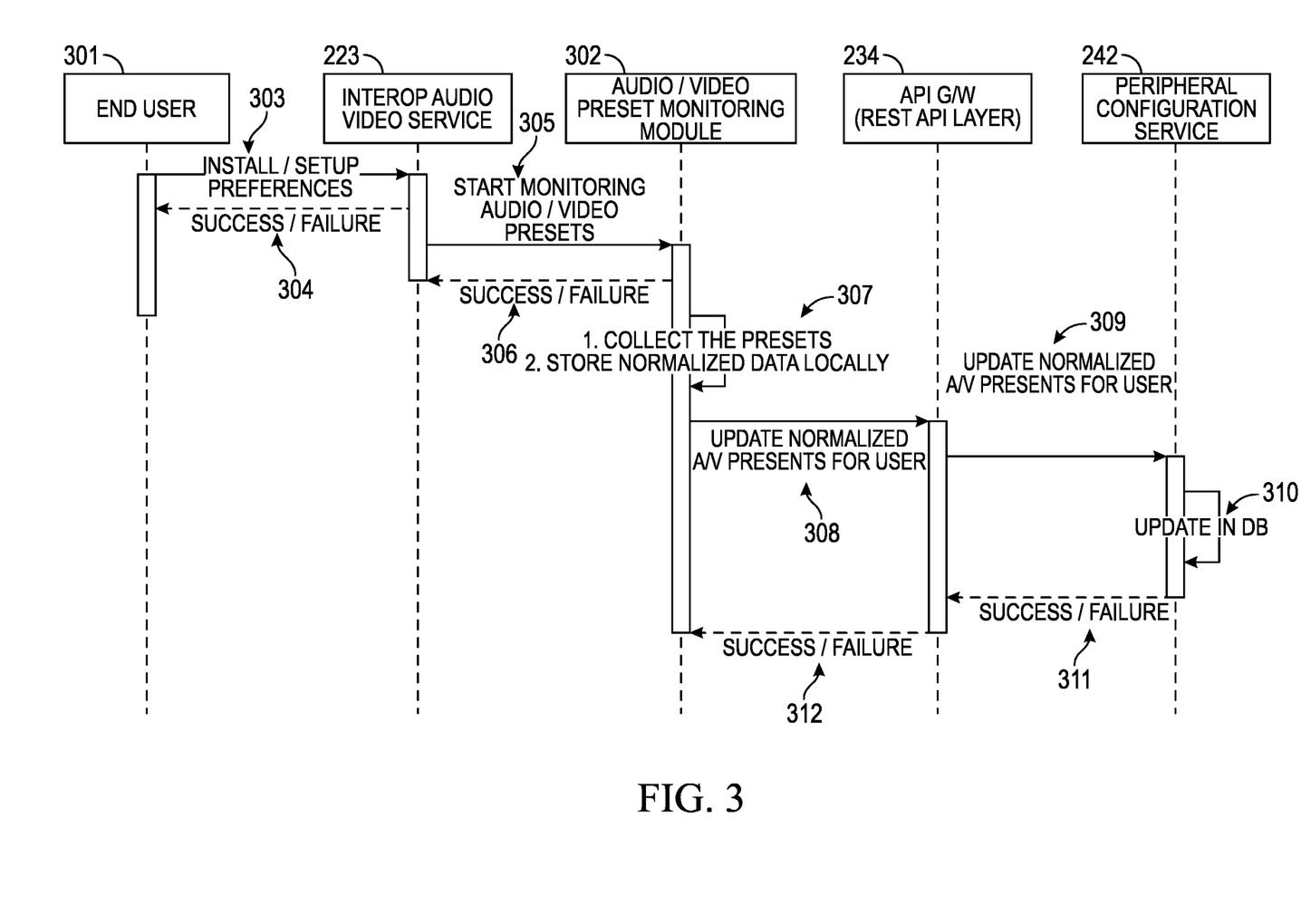
FIG. 3 depicts a sequence diagram of an example of a method for capturing A/V presets, according to some embodiments.
Figure 4A:
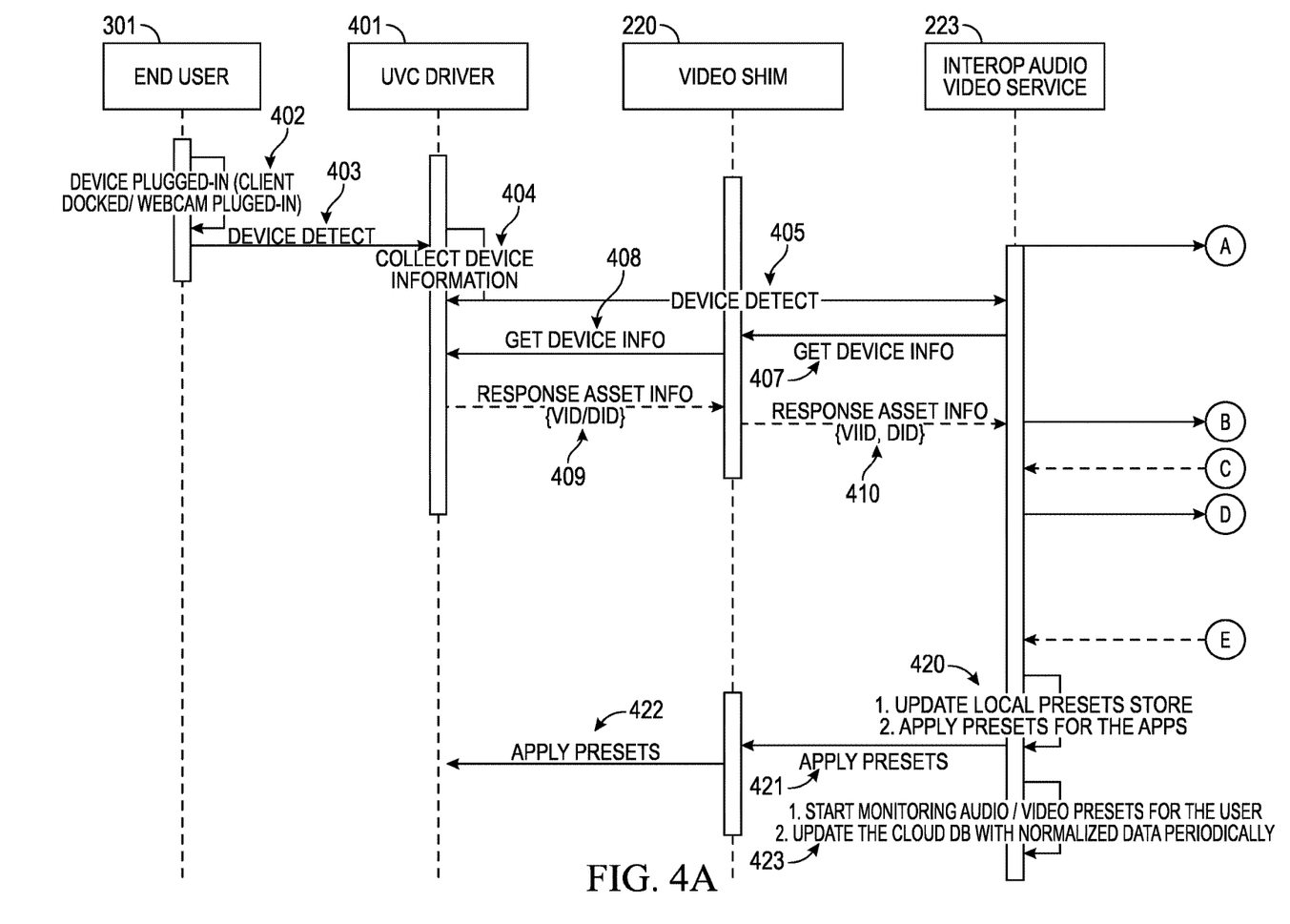
FIGS. 4A and 4B collectively depict a sequence diagram of an example of a method for applying A/V presets in different contexts, according to some embodiments.

In operation, the components of FIG. 2 may operate to execute one or more operations shown in FIG. 3, 4A, and/or 4B. For example, peripheral management gateway service 241 may expose an API for storing and retrieving A/V presets from the edge, whereas peripheral configuration service 242 may include a micro service configured to handle all user-specific audio and video configurations.

FIG. 3 depicts a sequence diagram of an example of a method for capturing A/V presets. In various embodiments, the method of FIG. 3 may be performed, at least in part, by one or more components shown in the system of FIG. 2. Particularly, at 303, end user 301 executes interop A/V service 223 to install or set up an A/V continuity service as described herein. At 304, interop A/V service 223 responds with a success or failure message, for example, depending upon the verification of the user's authentication or credentials by cloud service 235.

If user 301 is authorized to use or setup A/V preset continuity service, at 305 interop A/V service 223 starts monitoring audio or video presets using an internal A/V preset monitoring module 302. At 306, A/V preset monitoring module 302 indicates to interop A/V service 223 whether the monitoring has been successfully initiated.

At 307, A/V preset monitoring module 302 collects user presets and stores normalized preset data locally. At 308, A/V preset monitoring module 302 sends normalized A/V presets for the user to gateway API 234. At 309, gateway API 234 sends the normalized A/V presets for the user through gateway API 234 to peripheral configuration service 242.

At 310, peripheral configuration service 242 stores the normalized A/V presets in database 246. At 311, peripheral configuration service 242 sends a success or failure indication to gateway API 234, and at 312, gateway API 234 forwards the success or failure indication to A/V preset monitoring module 302.

When an end-user plugs audio (e.g., speaker/mic) and video (e.g., webcam) devices to IHS 100, interop A/V service 223 detects those A/V devices and starts monitoring for changes to A/V settings. Interop A/V service 223 monitors for personalized A/V configurations by the user.

When configurations are changed via gateway API 234, configuration change listener 302 on interop A/V service 223 receives a configuration change notification, for example, made via an application or system-tray controls. Based on the notification, interop A/V service 223 captures all current A/V presets, as well as information that identifies a current context (e.g., user, IHS, IHS posture, IHS location, applications in execution, workspace identification, dock and/or A/V devices available in the workspace, etc.).

If configurations are changed within a collaboration application, such as a video conferencing application, interop A/V service 223 monitors for collaboration session start events. Based on these start events, interop A/V service 223 captures A/V presets using shim layers 220 and 221 and normalizes the A/V presets for the current context. Shim layers 220 and 221 may translate REST data-provider calls into device-specific UVC commands and may apply those commands to the relevant A/V device.

With respect to changes made to A/V configurations from different applications for various connected peripherals, interop A/V service 223 observes, monitors, and normalizes the presets. For example, an indication that output volume is set at 50% may be the normalized value of an A/V device-specific configuration parameter (that sets the output volume at its halfway point in a particular piece of A/V device hardware).

Interop A/V service 223 formulates the normalized or device-agnostic presets and stores them in a local cache for future reference. In addition to local cache, interop A/V service 223 also pushes preset or configuration delta to database 246 via peripheral configuration service 242 using the gateway API 234. In some cases, A/V presets selected via application 214 or 215 are applied via virtual camera control points 216.

For illustration, a non-limiting example of a normalized A/V preset configuration for a user operating a given IHS in a certain workspace is shown below:
Workspace & User Details
"Workspace": {
"$":{
"identifier":"{727aa090-1250-4d70-9765-ea0b78595d0a}",
"location":"Dell 11 6th Floor",
"description":"D11_FLR6_A001",
"type":"hybrid-work"
}
},
"user-details":{
"$":{
"name": "Jason,Smith",
"email":"jason_smith@hiscompany.com",
"device-servicetag":"SDVNEKG",
"createddate": "2021-12-19T17:25:24+05:30",
"lastmodified":"2021-12-23T15:51:34+05:30"
}
},
Presets Configuration
"audio-video-presets":{
"applications":[{
"$":{
"name":"Application 1",
"version":"x.y.z.a",
"video-preset":{
"brightness":"140",
"contrast":"5",
"white-balance":"4600",
"anti-flicker":"true",
"auto-zoom":"enabled",
"auto-framing":"enabled",
"ditial-ptz":{
"pan":"true", "tilt":"70", "zoom":"50",
},
"sw-noise-suppression":"enabled",
"sharpness":"25",
"virtual-background":"https://mystorage/files/mybackgroud.jpg",
"camera":"Dell Ultra Sharp 4K Webcam"
},
"audio-preset":{
"volume":"30",
"noise-supression":"high",
"echo-cancellation":"aggressive",
"microphone":"Logitech USB Headset H340",
"speaker":"Logitech USB Headset H340"
}
}
}]}

Figure 4B:
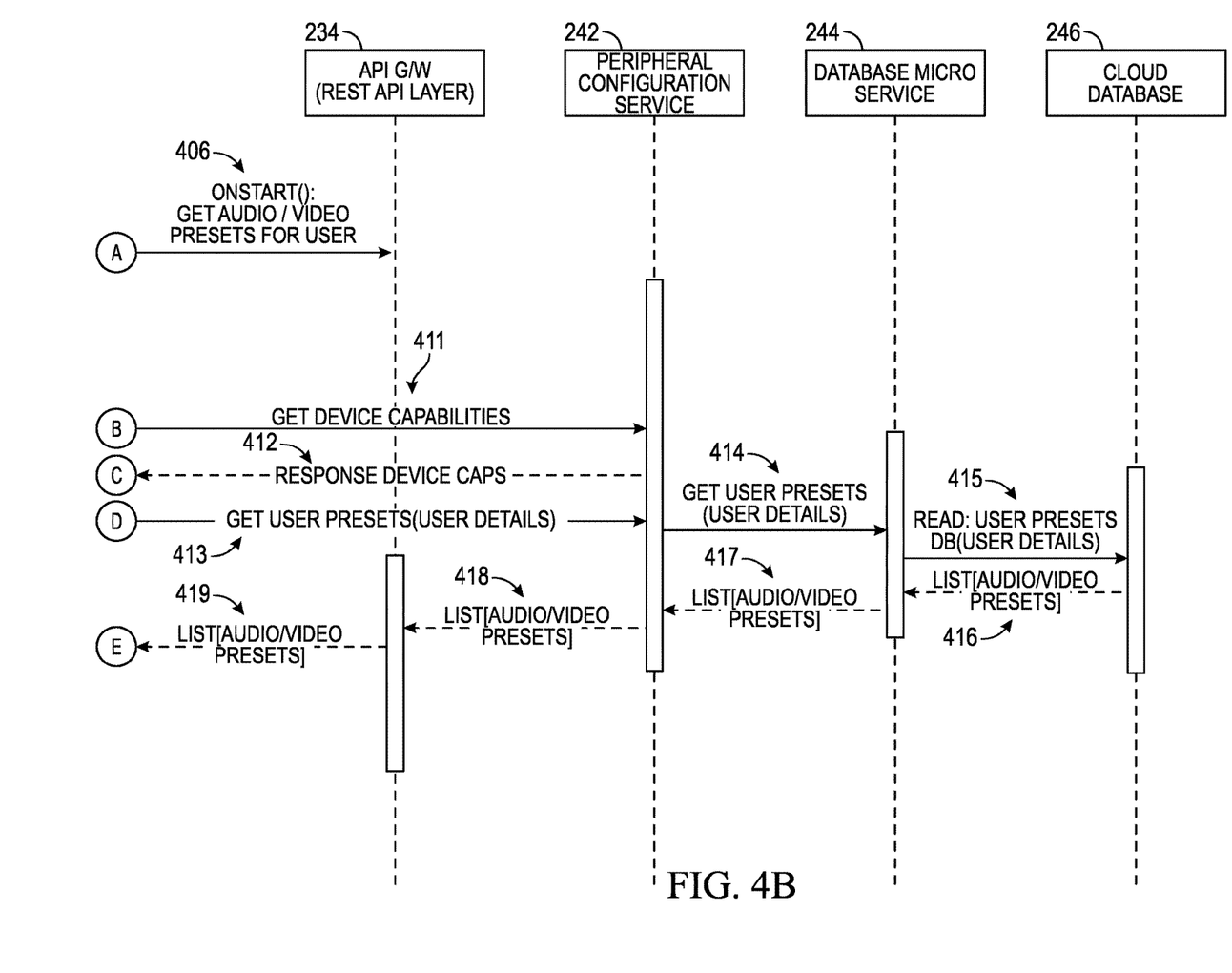

FIGS. 4A and 4B collectively depict a sequence diagram of an example of a method for applying A/V presets in different contexts. In various embodiments, the method of FIGS. 4A and 4B may be performed, at least in part, by one or more components shown in the system of FIG. 2, following execution of the method of FIG. 3.

Particularly, at 402, end user 301 docks IHS 100 at a workspace or plugs an A/V device (e.g., a webcam) directly into IHS 100. At 403, a device detect event is generated. At 404, UVC driver 401 (among OS drivers 210) collects A/V device information. At 405, UVC driver 401 notifies interop A/V service 223 that the A/V device has been plugged in. Here it should be noted that, upon instantiation, at 406 interop A/V service 223 may retrieve initial A/V presets for a current context through gateway API 234.

At 407, interop A/V service 223 sends a request to get device information to video shim 220, and at 408 video shim 220 forwards the request to UVC driver 401. At 409, UVC driver 401 responds to video shim 220 with the A/V device's information (e.g., vendor ID or "VID," device ID or "DID," other device details, etc.), and at 410 video shim 220 forwards the information to interop A/V service 223.

At 411, interop A/V service 223 sends a request to peripheral configuration service 242 to get device capabilities for the A/V device, for example, from peripheral inventory database 245. At 412, peripheral configuration service 242 responds to the request. At 413, interop A/V service 223 sends a request to get the user's presets to peripheral configuration service 242. At 414, peripheral configuration service 242 sends a message to database micro service 244 to get the user's A/V presets, and at 415 database micro service 244 sends a read command to database 246 to retrieve those presets.

At 416, database 246 returns a list of A/V presets to database micro service 244. At 417, database micro service 244 forwards the list to peripheral configuration service 242. At 418, peripheral configuration service 242 sends the list to gateway API 234. At 419, gateway API 234 forwards the list to interop A/V service 223.

At 420, interop A/V service 223 updates a local preset store and applies the retrieved A/V presets to the applications in execution. Particularly, at 421, interop A/V service 223 issues UVC commands to video shim 220 to apply the presets, and at 422 video shim 220 translates the commands into device-specific commands via UVC driver 401. At 423, interop A/V service 223 monitors A/V preset modifications made by the user and updates database 246 with normalized A/V preset data periodically.

When an end-user plugs audio (e.g., speaker/mic) and video (e.g., webcam) devices to IHS 100, interop A/V service 223 detects those A/V devices. Interop A/V service 223 queries A/V device identifiers (e.g., vendor/make/device/model/asset or service tag, etc.) information from the underlying shim layer 220. Interop A/V service 223 then sends this information to peripheral management gateway 241 and queries for all the device capabilities.

Once the capabilities are received, interop A/V service 223 requests a list of currently applied presets for the current context (e.g., per user/per device/per application). Based on the configurations pulled from peripheral configuration service 242, interop A/V service 223 compares the asset information with the connected devices. For example, retrieved A/V settings may be applicable to situations where: the user uses a BT speaker with integrated microphone and integrated webcam in home environment, the user uses a BT headset with an external webcam at office cubicle environment, and/or the user switches to a BT headset with integrated webcam in any other environment.

In each of these cases, interop A/V service 223 detects the A/V device connected to IHS 100 and, if the A/V device includes a camera or webcam, interop A/V service 223 associates it with virtual camera 213. Once the user preferences are pulled from cloud service 235, interop A/V service 223 filters the configurations appropriate for the connected peripherals. Interop A/V service 223 also reads and normalizes the A/V presets from the local cache. Based on this, interop A/V service 223 pushes the A/V configuration for the system using shim layers 220 and 221 and sets it for virtual camera 213. These configurations are translated to the relevant A/V device via virtual camera control points 216.

Interop A/V service 223 monitors for collaboration session start events. Once user starts a video/audio call session, based on the preferences captured, interop A/V service 223 applies the A/V presets captured for the collaboration application context to the connected peripherals. Moreover, after these preferences are applied, interop A/V service 223 starts monitoring for any further changes to the A/V presets.

For illustration, non-limiting examples of normalized A/V preset configurations that can be translated into A/V device-specific settings in a given context are shown below:

Workspace & User Details
"Workspace": {
"$":{
"identifier":"{727aa090-1250-4d70-9765-ea0b78595d0a}",
"location":"Dell 11 6th Floor",
"description":"D11_FLR6_A001",
"type":"hybrid-work"
}
},
"user-details":{
"$":{
"name": "Jason,Smith",
"email":"jason_smith@hiscompany.com",
"device-servicetag":"SDVNEKG",
"createddate": "2021-12-19T17:25:24+05:30",
"lastmodified":"2021-12-23T15:51:34+05:30"
}
},
Device Info
"device-details":{
"$":{
"name": "Dell Ultra Sharp 4K Webcam",
"protocol":"UVC",
"vendor-id":"413C",
"device-id": "C015",
"asset-info":"38AA0D2E"
}
},
UVC API Configuration
"audio-video-presets":{
"applications":[{
"$":{
"name":"Application 1",
"version":"x.y.z.a",
"video-preset":{
"auto-framing":"enabled",
"sw-noise-suppression":"enabled",
"field-of-view":"78",
"camera":"Dell Ultra Sharp 4K Webcam"},
}
}]}
Setting Advanced Video Noise Reduction
extensionProp.Property.Set=WEBCAM_XU_SET_ID;
extensionProp.Property.Id=0x12;
extensionProp.Property.Flags=KSPROPERTY_TYPE_SET|KSPROPERTY_TYPE_TOPOLOGY;
extensionProp.NodeId=_xuNodeId;
value.constData[0]=0x1
HRESULT hr=_iKsControl→KsProperty((PKSPROPERTY)&extensionProp, sizeof(extensionProp), (LPVOID)value.constData( ), value.size( ), &bytesReturned);
Setting Field of View control
extensionProp.Property.Set=WEBCAM_XU_SET_ID;
extensionProp.Property.Id=0x10;
extensionProp.Property.Flags=KSPROPERTY_TYPE_SET|KSPROPERTY_TYPE_TOPOLOGY|
extensionProp.NodeId=_xuNodeId;
value.constData[0]=0x1
value.constData[1]=0x004E
HRESULT hr=_iKsControl→KsProperty((PKSPROPERTY)&extensionProp, sizeof(extensionProp), (LPVOID)value.constData( ), value.size( ), &bytesReturned);
Setting Auto Framing Control
extensionProp.Property.Set=WEBCAM_XU_SET_ID;
extensionProp.Property.Id=0x14;
extensionProp.Property.Flags=KSPROPERTY_TYPE_SET|KSPROPERTY_TYPE_TOPOLOGY;
extensionProp.NodeId=_xuNodeId;
value.constData[0]=0x1
HRESULT hr=_iKsControl→KsProperty((PKSPROPERTY)&extensionProp, sizeof(extensionProp), (LPVOID)value.constData( ), value.size( ), &bytesReturned);

Accordingly, systems and methods described herein provide mechanisms for supporting A/V preset continuity for users across different contexts using a scalable architecture with cloud service control points, end points on the device, and an ISV-agnostic translation layer configured to capture, process, and configure A/V presets. These systems and methods may be used to, for example: capture user preferences for A/V presets on a per IHS, per user, per peripheral, and/or per application context; contextually capture the A/V presets when changed from collaboration applications based on session events; normalize presets for a specific IHS to connected a given peripheral combination, OS, or device; and/or provide a same or consistent visual or audio sensory experience to a user of the IHS in different contexts or workspaces.

Moreover, systems and methods described herein may be scalable for multiple IHSs, may support collaborative applications (e.g., videoconferencing), web apps, and any type of A/V applications, and may be extended to provide persona-based A/V presets (e.g., presets for "home," "office," "traveling," etc.). Rather than requiring a user to have to remember and manually re-configure many A/V presets for every session and in every IHS to every connected peripheral in use, these systems and methods allow the user to have a more seamless experience across different contexts and workspaces.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
identify a first audio or video setting used by a first audio or video device coupled to the IHS in a first context;
normalize the first IHS audio or video setting into a normalized setting;
in response to a determination that the IHS is in a second context, translate the normalized setting into a second audio or video setting; and
apply the second audio or video setting to a second audio or video device coupled to the IHS.

2. The IHS of claim 1, wherein the first audio or video setting comprises at least one of: brightness, contrast, white-balance, anti-flicker, auto-zoom, auto-framing, pan, tilt, zoom, video noise suppression, sharpness, or virtual background.

3. The IHS of claim 2, wherein the first audio or video device comprises at least one of: an integrated camera or an external camera.

4. The IHS of claim 1, wherein the first audio or video setting comprises at least one of: input volume, output volume, balance, equalization, audio noise suppression, or echo cancellation.

5. The IHS of claim 4, wherein the first audio or video device comprises at least one of: an integrated microphone, an external microphone, an integrated speaker, or an external speaker.

6. The IHS of claim 1, wherein the first audio or video device comprises a device make or model, and wherein the second audio or video device comprises a different device make or model.

7. The IHS of claim 1, wherein the first context comprises a first application in execution by the IHS, and wherein the second context comprises a second application in execution by the IHS.

8. The IHS of claim 1, wherein the first context comprises a first workspace where the IHS and the first audio or video device are located, and wherein the second context comprises a second workspace where the IHS and the second audio or video device are located.

9. The IHS of claim 1, wherein the program instructions, upon execution, further cause the IHS to:
transmit the normalized setting to a remote service after the normalization of the first audio or video setting into the normalized setting; and
retrieve the normalized setting from the remote service prior to the translation of the normalized setting into the second audio or video setting.

10. The IHS of claim 1, wherein the program instructions, upon execution, further cause the IHS to:
determine a change to the first audio or video setting; and
update the normalized audio or video setting to reflect the change.

11. A method, comprising:
identifying a first audio or video setting selected by a user operating a first Information Handling System (IHS);
normalize the first audio or video setting into a normalized setting;
transmitting the normalized setting to a remote service;
determining that the user is operating a second IHS;
retrieving the normalized setting from the remote service;
translating the normalized setting into a second audio or video setting; and
applying the second audio or video setting to the second IHS.

12. The method of claim 11, wherein the first audio or video setting comprises at least one of: brightness, contrast, white-balance, anti-flicker, auto-zoom, auto-framing, pan, tilt, zoom, video noise suppression, sharpness, or virtual background.

13. The method of claim 11, wherein the first audio or video setting comprises at least one of: input volume, output volume, balance, equalization, audio noise suppression, or echo cancellation.

14. The method of claim 11, wherein the first IHS is coupled to an audio or video device, and wherein the second IHS is coupled to a different audio or video device having a different device make or model.

15. The method of claim 11, further comprising determining that the second IHS is executing a video conferencing application, and applying the second audio or video setting, at least in part, in response to the determination.

16. The method of claim 11, further comprising determining that the second IHS is located in a selected workspace, and applying the second audio or video setting, at least in part, in response to the determination.

17. A memory storage device having program instructions stored thereon that, upon execution by an Information Handling System (IHS), cause the IHS to:
identify a first audio or video setting used in connection with a first audio or video device coupled to the IHS in a first workspace;
normalize the audio or video setting into a normalized setting;
in response to a determination that the IHS is in a second workspace, translate the normalized setting into a second audio or video setting; and
use the second audio or video in connection with a second audio or video device coupled to the IHS in the second workspace.

18. The memory storage device of claim 17, wherein the first and second audio or video settings are different from each other, and wherein the first and second audio or video settings provide a same visual or audio sensory experience to a user of the IHS in the first and second workspaces.

19. The memory storage device of claim 17, wherein the first and second audio or video setting are selected from the group consisting of: brightness, contrast, white-balance, anti-flicker, auto-zoom, auto-framing, pan, tilt, zoom, video noise suppression, sharpness, virtual background, input volume, output volume, balance, equalization, audio noise suppression, and echo cancellation.

20. The memory storage device of claim 17, wherein the program instructions, upon execution, further cause the IHS to determine that the IHS is executing a video conferencing application, and use the second audio or video setting, at least in part, in response to the determination.

* * * * *